(12) United States Patent
Gozalvez Serrano et al.

(10) Patent No.: US 10,476,574 B2
(45) Date of Patent: Nov. 12, 2019

(54) METHOD AND APPARATUS FOR OPERATING A WIRELESS COMMUNICATION INTERFACE FOR A RADIO NETWORK

(71) Applicant: Bayerische Motoren Werke Aktiengesellschaft, Munich (DE)

(72) Inventors: David Gozalvez Serrano, Munich (DE); Adrian Posselt, Munich (DE); Christian Arendt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/171,040

(22) Filed: Oct. 25, 2018

(65) Prior Publication Data

US 2019/0132039 A1 May 2, 2019

(30) Foreign Application Priority Data

Oct. 26, 2017 (DE) .................. 10 2017 219 249

(51) Int. Cl.
*H04B 7/06* (2006.01)
*H04B 7/04* (2017.01)

(52) U.S. Cl.
CPC ............ *H04B 7/0632* (2013.01); *H04B 7/04* (2013.01); *H04B 7/0617* (2013.01); *H04B 7/0695* (2013.01)

(58) Field of Classification Search
CPC ... H04B 7/0632; H04B 7/0617; H04B 7/0695
See application file for complete search history.

(56) References Cited

U.S. PATENT DOCUMENTS

| | | | |
|---|---|---|---|
| 5,303,240 A | 4/1994 | Borras et al. | |
| 2003/0234720 A1* | 12/2003 | MacNeille | G08G 1/161 340/435 |
| 2014/0309917 A1* | 10/2014 | Beaurepaire | G08G 1/017 701/300 |
| 2016/0021622 A1 | 1/2016 | Ljung et al. | |
| 2016/0352403 A1 | 12/2016 | Kishiyama et al. | |
| 2017/0047998 A1* | 2/2017 | Palanisamy | H04B 10/25759 |

OTHER PUBLICATIONS

German Search Report issued in German counterpart application No. 10 2017 219 249.8 dated Apr. 30, 2018, with Statement of Relevancy (Eight (8) pages).

* cited by examiner

*Primary Examiner* — Lan-Huong Truong
(74) *Attorney, Agent, or Firm* — Crowell & Moring LLP

(57) ABSTRACT

The invention relates to a method for operating a wireless communication interface arranged in a vehicle, in particular a motor vehicle, an apparatus for operating a wireless communication interface and a vehicle, in particular a motor vehicle, having an apparatus for operating a wireless communication interface and a control device. According to the invention, at least one uplink user data signal is taken as a basis for determining a channel quality indicator for the user data signal, so that channel quality determination is performable in the application layer independently of determination methods for the channel quality based on pilot, control or protocol signals.

20 Claims, 3 Drawing Sheets

METHOD AND APPARATUS FOR OPERATING A WIRELESS COMMUNICATION INTERFACE FOR A RADIO NETWORK

CROSS REFERENCE TO RELATED APPLICATION

This application claims priority under 35 U.S.C. § 119 from German Patent Application No. 10 2017 219 249.6, filed Oct. 26, 2017, the entire disclosure of which is herein expressly incorporated by reference.

BACKGROUND AND SUMMARY OF THE INVENTION

The invention relates to a method for operating a wireless communication interface arranged in a vehicle, in particular a motor vehicle, an apparatus for operating a wireless communication interface and a vehicle, in particular a motor vehicle, having an apparatus for operating a wireless communication interface and a control device.

Vehicles increasingly use wireless communication interfaces in order to be able to communicate with other communication devices, in particular via a mobile radio link, while traveling too. As a result, a wide variety of data can be interchanged with a backend of a radio network in order to obtain up-to-date traffic information, for example, or else in order to conduct a telephone call between the driver and another person.

Sending and receiving data via a radio network while the vehicle is in the parked condition in an underground garage, for example, is found to be difficult, however. By way of example, the radio signal is attenuated on the basis of obstacles such as a wall situated between the vehicle and a base station, for example, which is why the signal strength for sending and receiving these radio signals is often not adequate to maintain a radio link.

By way of example, the prior art thus discloses the practice of using beamforming to improve the radiation characteristic of a communication interface, so that the radio signals are sent directionally. U.S. Pat. No. 5,303,240 B discloses a communication system for determining an optimized direction for sending and receiving a signal in a radio network. In this arrangement, multiple training signals for training the communication system are used to evaluate the signal quality of the training signal on the physical layer, the direction of radiation of the antenna being altered for each training signal. Based on the best direction of radiation of the antenna, the normal communication of the communication system is continued in this case.

It is an object of the invention to provide an improved method for operating a wireless communication interface for a radio network, which wireless communication interface is arranged in a vehicle, in particular a motor vehicle. In addition, it is an object of the invention to improve an apparatus for operation in a radio network having a wireless communication interface. Further, a further object of the invention is to provide an improved vehicle, in particular a motor vehicle, having such an apparatus for operation in a radio network.

These objects are achieved by a method according to claim 1, an apparatus according to claim 12 and a vehicle according to claim 13.

A first aspect of the invention relates to a method for operating a wireless communication interface for a radio network, which wireless communication interface is arranged in a vehicle, in particular a motor vehicle, and which method is carried out in particular while the vehicle is at a standstill, having the following work steps:

emitting a first electromagnetic uplink user data signal by means of the communication interface; and receiving at least one electromagnetic downlink user data signal by means of the communication interface, wherein the downlink user data signal has been emitted by a backend, in particular via the radio network, and the user data have a channel quality indicator, determined by the backend, for the at least first emitted user uplink data signal.

The method according to the invention can in particular allow determination of the channel quality of a wireless connection from the communication interface to the backend, in particular via the radio network, to be performed in a simplified manner. According to the invention, a particular effect that can be achieved is that the channel quality can be determined in the application layer on the basis of the user data signal in the uplink and downlink directions. Therefore, it is in particular possible for the channel quality to be determined in the application layer by means of a user data signal independently of the physical layer. Preferably, the method according to the invention can achieve the effect that channel quality determination is performable in the application layer independently of determination methods for the channel quality based on pilot, control or protocol signals, in particular in the case of mobile radio links as in the case of the LTE standard, for example. In particular, the method is carried out when the vehicle is at a standstill, since only a small change in the radio channel can be expected in this case and the method according to the invention is performable in a particularly suitable manner.

A communication interface within the context of the invention is a communication device having at least one antenna by means of which a wireless connection to a further communication device in a radio network is possible.

An antenna within the context of the invention is a device for wirelessly emitting and/or receiving radio signals. The antenna is preferably set up to send and/or receive radio signals directionally, that is to say on the basis of a solid angle.

A user data signal within the context of the invention is at least one signal having user data that is used in the application layer in a vehicle and/or backend. In particular, it should be mentioned that a user data signal can be distinguished from what are known as pilot, control and protocol signals, as are used in the LTE standard, for example.

An uplink direction within the context of the invention is that communication direction in which data are sent from a communication interface of a vehicle to a backend.

A downlink direction within the context of the invention is that communication direction in which data are sent from a backend to a communication interface of a vehicle.

A backend within the context of the invention is an apparatus that evaluates the user data signals sent in the uplink, processes them and returns a possible response as a downlink user data signal via a downlink channel of a radio network.

A physical layer within the context of the invention is that layer during the transmission of a signal on which the user data signal is transmitted as an analog signal, in particular as an electrical signal and/or as a radio signal, and is the bottommost, first layer for the OSI reference model.

An application layer within the context of the invention is that layer during the transmission of a signal on which the user data signal can be processed by an application in a manner readable as a digital bit string, and is the topmost, seventh layer for the OSI reference model.

A channel quality indicator within the context of the invention is a value determining the quality of a user data signal, in particular of an uplink user data signal, received from the backend, preferably on the basis of predetermined rating algorithms in the application layer.

A radiation characteristic within the context of the invention is a value or a value range that, during the sending of an electromagnetic signal, provides information about the distribution of the signal strength of the electromagnetic signal in at least two dimensions, preferably three dimensions, starting from the communication interface, in particular the antenna thereof.

A solid angle within the context of the invention starting from a communication interface, in particular the antenna thereof, is that angle at which an electromagnetic signal from the communication interface, in particular the antenna thereof, is at a maximum during the sending process. The solid angle has at least one angle in two-dimensional space, preferably two angles in three-dimensional space, so that it is explicitly determinable.

A latency within the context of the invention is a time delay arising on the basis of the transmission from a transmitter to a receiver. Further, latency also includes all delays arising on the basis of the processing of the radio signals.

A packet error rate within the context of the invention is a measure of the quality of the transmission of user data signals from a transmitter to a receiver. Preferably, this is a value providing information about how many error-free user data signals have been received in relation to erroneous user data signals.

Beamforming within the context of the invention denotes a specific form of the radiation characteristic of a communication interface, in particular the antenna thereof. In this case, it is in particular possible for the solid angle at which the maximum of the radiation of the electromagnetic user data signal occurs to be adapted in at least two dimensions and more preferably in three dimensions, so that the position of the receiver can be taken as a basis for sending the electromagnetic user data signal thereto in a targeted manner.

In a preferred configuration, the method has the following additional work steps:

emitting the second electromagnetic uplink user data signal by means of the communication interface, wherein the communication interface emits the first uplink user data signal at a first predetermined solid angle and the second uplink user data signal at a second predetermined solid angle, which is different than the first; and operating the communication interface over that solid angle at which the first or the second uplink user data signal has the better channel quality indicator.

This can achieve the particular effect that the radiation characteristic of the communication interface is modified so that said communication interface uses what is known as beamforming. By emitting the user data signal at at least two predetermined and different solid angles, it is possible to use that solid angle at which the uplink user data signal has the better channel quality indicator for a further transmission of user data. Preferably, this allows the connection and hence also the transmission of data via the air interface to be improved and simplified, since the transmission of the user data signal is used to determine the channel quality indicator in the application layer on the basis of at least two different solid angles and, on the basis of that, in turn to adapt the radiation characteristic of the communication interface, in particular the antenna thereof, accordingly. This can allow an improvement in the wireless connection by means of beamforming even without protocol and/or control and/or pilot channels, as are used in the LTE standard, for example.

In a further preferred configuration of the method, the first and second predetermined solid angles are arranged oppositely at least in a two-dimensional plane, preferably in a three-dimensional space.

This can in particular allow the communication interface to carry out the emission of the uplink user data signal by means of beamforming such that at least one solid angle at which the first or second uplink user data signal has been emitted, and which correlates to an increased channel quality indicator, is determinable, at which the next connection via a base station to the backend is subsequently made by means of beamforming over this solid angle and therefore the wireless connection is improved.

In a further preferred configuration of the method, the method has the following additional work steps:

emitting the second electromagnetic uplink user data signal by means of the communication interface, wherein the communication interface emits the first uplink user data signal at least by means of a first antenna of the communication interface and the second uplink user data signal by means of at least one second antenna of the communication interface; and operating the communication interface using that antenna for which the first or the second uplink user data signal has the better channel quality indicator.

Preferably, this can achieve the effect that the use of multiple transmission antennas means that that antenna that correlates to the higher channel quality indicator is used for the further transmission of user data signals. Accordingly, the use of uplink user data signals can in turn achieve the effect, in the application layer itself, that the channel quality indicators determined by the backend can be taken as a basis for performing simpler and better adaptation of the transmission channel.

In a further preferred configuration of the method, the method has the following additional work steps:

emitting the second electromagnetic uplink user data signal by means of the communication interface, wherein the communication interface emits the first uplink user data signal by means of at least the first and the second antenna and the second uplink user data signal by means of at least the first and/or the second antenna and at least one third antenna of the communication interface at the same time; and operating the communication interface using those antennas for which the first or the second uplink user data signal has the better channel quality indicator.

These work steps, in which different antenna configurations are used for sending the uplink user data signal, can preferably be used to achieve the effect that that antenna configuration for which an uplink user data signal correlates to the highest ascertained channel quality indicator is used. In particular, this can allow what is known as the MISO (Multiple Input Signal Output) and/or else MIMO (Multiple Input Multiple Output) principle to improve the channel quality of the wireless connection.

In a further preferred configuration of the method, the channel quality indicator is dependent on the latency and/or the packet error rate of the first and/or the second uplink user data signal received from the backend.

Preferably, this can achieve the effect that the channel quality indicator can be determined on the basis of parameters of the transmission that are accessible generally, in particular in the application layer, independently of parameters relating to the physical layer of the transmission channel, such as the signal-to-noise ratio, for example. Therefore, the adaptation of the communication interface can be improved and simplified, so no additional control and/or protocol and/or else pilot information or channels need to be used, as exist in the LTE standard, for example.

In a further preferred configuration of the method, the method has the additional method step of:

storing the channel quality indicator, determined by the backend, of the at least first and/or the at least second emitted uplink user data signal in a data memory of a control device.

Storing the channel quality indicator can achieve the particular effect that the control device, which is preferably also set up for adapting the communication interface, uses the optimized emission and/or transmission of the user data signal ascertained by the method for the further connection between the communication interface and the backend.

In a further preferred configuration of the method, the method has the additional work step of:

storing the channel quality indicator of the first and/or the second emitted uplink user data signal with a predetermined value in the data memory of the control device, in particular after a predetermined interval of time after emission of the first and/or second uplink user data signal, if the communication interface does not receive a downlink user data signal denoting the channel quality indicator for the first and/or the second emitted uplink user data signal.

In particular, this can achieve the effect that that uplink user data signal for which, firstly, transmission errors in the physical layer, in particular an excessively weak signal-to-noise ratio, mean that a usable user data signal, whether in the uplink or in the downlink, cannot be used is assigned a predetermined, in particular low and/or poor, channel quality indicator. Secondly, it is preferably also possible for an uplink user data signal for which other problems arose during the transmission, such as a timeout, for example, in the case of which no response to the uplink user data signal has been provided by the backend or has been received by the communication interface within a predetermined interval of time, to be assigned a low and/or poor channel quality indicator.

In a further preferred configuration of the method, the method has the following additional work step of:

receiving at least one further electromagnetic downlink user data signal by means of the communication interface, wherein the downlink user data signal has been emitted by the backend, in particular via the radio network, and the user data have at least one channel quality indicator, determined by the backend, for the second emitted uplink user data signal.

Preferably, this can achieve the effect that a separate downlink user data signal is received for each uplink user data signal, as a result of which the channel quality indicators for the uplink user data signals are received independently.

In a further preferred configuration of the method, at least the work steps, namely emitting the first electromagnetic uplink user data signal by means of the communication interface and receiving the electromagnetic downlink user data signal by means of the communication interface, wherein the downlink user data signal has been emitted by the backend, in particular by the radio network, and the user data have the channel quality indicator, determined by the backend, for the at least first emitted uplink user data signal, are repeated if a predetermined parameter changes during operation of the communication interface.

Preferably, at least additionally the work steps for emitting the second electromagnetic uplink user data signal by means of the communication interface, wherein the communication interface emits the first uplink user data signal at the first predetermined solid angle and the second uplink user data signal at the second predetermined solid angle, which is different than the first, and for operating the communication interface over that solid angle at which the first or the second uplink user data signal has the better channel quality indicator are repeated if a predetermined parameter changes during operation of the communication interface.

More preferably, at least additionally the work steps for emitting the second electromagnetic uplink user data signal by means of the communication interface, wherein the communication interface emits the first uplink user data signal at least by means of the first antenna of the communication interface and the second uplink user data signal by means of the second antenna of the communication interface, and for operating the communication interface using that antenna for which the first or the second uplink user data signal has the better channel quality indicator are repeated if a predetermined parameter changes during operation of the communication interface.

Further, more preferably at least additionally the work steps for emitting the second electromagnetic uplink user data signal by means of the communication interface, wherein the communication interface emits the first uplink user data signal by means of at least the first and the second antenna and the second uplink user data signal by means of at least the first and/or the second antenna and at least one third antenna of the communication interface at the same time, and for operating the communication interface using those antennas for which the first or the second uplink user data signal has the better channel quality indicator are repeated if a predetermined parameter changes during operation of the communication interface.

In a further preferred configuration of the method, the predetermined parameter relates to a change of position of the communication interface and/or expiry of a predetermined interval of time and/or exceedance of the packet error rate and/or exceedance of the latency of the first and/or second uplink user data signal and/or of at least one further received downlink user data signal.

Preferably, this can achieve the effect that operation of the communication interface is updated by virtue of an impairment and/or generic change in the wireless transmission between the vehicle and the base station connected to the backend resulting in the work steps according to the invention being performed repeatedly as explained above in order to allow optimized wireless transmission over a long period.

A second aspect of the invention relates to an apparatus for operation in a radio network having a wireless communication interface, wherein the apparatus is arranged in a vehicle, in particular a motor vehicle, and, in particular while the vehicle is at a standstill, is set up to emit a first electromagnetic uplink user data signal by means of the communication interface and to receive at least one electromagnetic downlink user data signal by means of the communication interface, wherein the downlink user data signal has been emitted by a backend, in particular via the radio network, and the user data have a channel quality indicator, determined by the backend, for the at least first emitted uplink user data signal.

A third aspect of the invention relates to a vehicle, in particular a motor vehicle, having an apparatus for operation in a radio network having a wireless communication interface.

The features and advantages described for the first aspect of the invention and the advantageous configuration of said aspect also apply to the second and third aspects of the invention and the advantageous configuration of said aspects, and vice versa.

Further features, advantages and possibilities for application of the invention are obtained from the description below in connection with the figures, throughout which the same reference signs are used for the same or corresponding elements of the invention. In the figures, at least in part schematically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
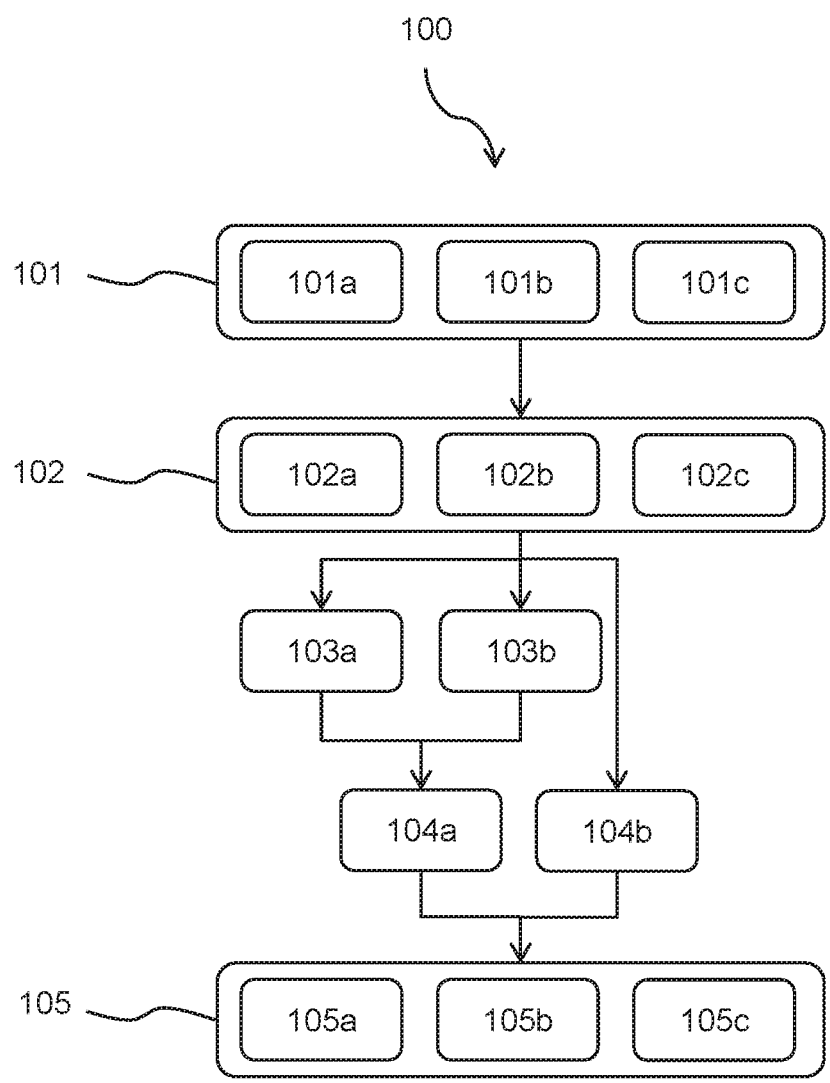
FIG. 1 shows an exemplary embodiment of a method according to the invention for operating a wireless communication interface for a radio network, which wireless communication interface is arranged in a vehicle, in particular a motor vehicle.

FIG. 1 shows an exemplary embodiment of a method 100 according to the invention for operating a wireless communication interface 2 for a radio network, which wireless communication interface is arranged in a vehicle 10, in particular a motor vehicle.

In a first work step 101, a first electromagnetic uplink user data signal 12 is emitted by means of the communication interface 2. This first work step 101 can be divided into work steps 101a, 101b and 101c, work step 101a involving the first electromagnetic uplink user data signal 12 being emitted by the communication interface 2 at a first predetermined solid angle α.

In work step 101b, the first electromagnetic uplink user data signal 12 is emitted at least by means of a first antenna 3 of the communication interface 2.

In work step 101c, the first electromagnetic uplink user data signal 12 is emitted by means of at least the first antenna 3 and a second antenna 4 of the communication interface 2 at the same time.

Further, all three work substeps 101a, 101b, 101c can be carried out in all combinations at the same time and/or in succession.

In a second work step 102, a second electromagnetic uplink user data signal 13 is emitted by means of the communication interface 2. This second work step 102 can again be divided into work steps 102a, 102b and 102c, work step 102a involving the second electromagnetic uplink user data signal 13 being emitted by the communication interface 2 at a second predetermined solid angle β.

In work step 102b, the second electromagnetic uplink user data signal 13 is emitted at least by means of the second antenna 4 of the communication interface 2.

In work step 102c, the second electromagnetic uplink user data signal 13 is emitted by means of at least the first antenna 3 and/or the second antenna 4 and at least one third antenna 5 of the communication interface 2 at the same time.

Further, all three work substeps 102a, 102b, 102c can be carried out in all combinations at the same time and/or in succession.

In a further work step 103a, 103b, at least one electromagnetic downlink user data signal is received by means of the communication interface 2, wherein the downlink user data signal has been emitted by a backend 8, in particular via the radio network, and the user data have a channel quality indicator, determined by the backend 8, for the at least first and/or second emitted uplink user data signal 12, 13.

In a work step 104a, the channel quality indicator, determined by the backend 8, of the at least first and/or the at least second emitted uplink user data signal 12, 13 is stored in a data memory 7 of a control device 6.

In a work step 104b, the channel quality indicator of the first and/or the second emitted uplink user data signal 12, 13 is stored with a predetermined value in the data memory 7 of the control device 6, in particular after a predetermined interval of time after emission of the first and/or second uplink user data signal 12, 13, if the communication interface 2 does not receive a downlink user data signal denoting the channel quality indicator for the first and/or the second emitted uplink user data signal 12, 13.

In a last work step 105, operation of the communication interface 2 is performed. In a work step 105a, the communication interface 2 is operated over that solid angle at which the first or the second uplink user data signal 12, 13 has the better channel quality indicator.

In a work step 105b, the communication interface 2 is operated using that antenna for which the first or the second uplink user data signal 12, 13 has the better channel quality indicator.

In a work step 105c, the communication interface 2 is operated using those antennas, in particular at the same time, for which the first or the second uplink user data signal 12, 13 has the better channel quality indicator.

Further, all three work substeps 105a, 105b, 105c can be carried out in all combinations at the same time and/or in succession.

Preferably, the channel quality indicator is dependent on the latency and/or the packet error rate of the first and/or the second uplink user data signal 12, 13 received from the backend 8.

It should be pointed out at this juncture that a person skilled in the art would consider all variations and combinations of the method according to the invention in order to improve and/or simplify the communication interface and the transmission thereof.

Further, it should be pointed out that work steps 101, 102, 103 and 105 can and/or are supposed to be repeated if a predetermined parameter changes during operation of the communication interface 2.

In particular, this predetermined parameter relates to a change of position of the communication interface 2 and/or expiry of a predetermined interval of time and/or exceedance of the packet error rate and/or exceedance of the latency of the first and/or second uplink user data signal 12, 13 and/or of at least one further received downlink user data signal.

Figure 2A:
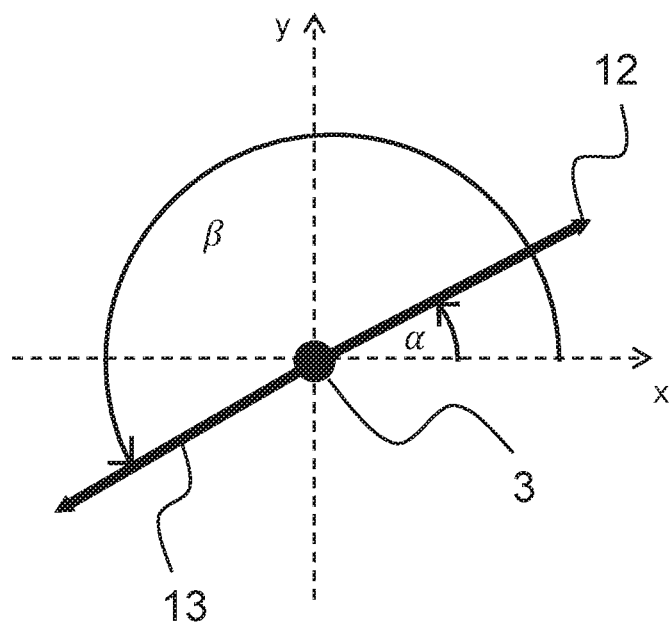
FIG. 2a shows a plan view of an exemplary embodiment of a first antenna according to the invention for emitting an uplink user data signal in two-dimensional space.

FIG. 2a shows a plan view of an exemplary embodiment of a first antenna 3 according to the invention for emitting an uplink user data signal in two-dimensional space. In this arrangement, a first uplink user data signal 12 is arranged in the first quadrant of the Cartesian coordinate system, this first uplink user data signal 12 being at an angle α relative to the positive x axis. A second uplink user data signal 13 extends from the first antenna 3 into the third quadrant of the Cartesian coordinate system. This second uplink user data signal 13 is at an angle relative to the positive x axis. In this depiction, the first uplink user data signal 12 is arranged oppositely in particular in two axes and therefore in two dimensions, so that preferably an improved direction of radiation of the first antenna 3 is ascertainable. Further, it is naturally also possible for 3, 4, 5, 6, 7, 8 or else further directions of radiation to be evaluated according to the method of the present invention.

At this juncture, it should be pointed out that determining the solid angle in two-dimensional space only requires just one angle to be indicated, since the precise angular dependency of the uplink user data signal resulting from the origin of the Cartesian coordinate system and therefore the first antenna 3 is explicit on the basis of the arrangement of the x and y axes on the basis of simple mathematical laws.

Figure 2B:
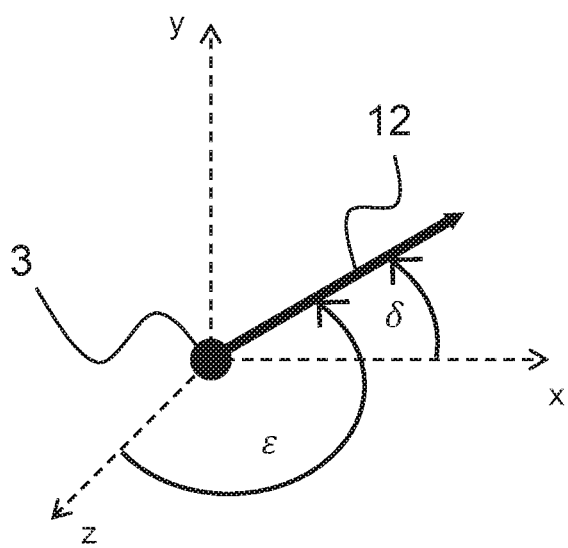
FIG. 2b shows an exemplary embodiment of a first antenna according to the invention for emitting an uplink user data signal in three-dimensional space.

FIG. 2b shows an exemplary embodiment of a first antenna 3 according to the invention for emitting an uplink user data signal in three-dimensional space. It should be pointed out that, on the basis of simplifications, the first antenna 3 is depicted as a point source. By way of example, a first uplink user data signal 12 is depicted that is at a first angle δ relative to the positive x axis and at a second angle ε relative to the positive z axis, which in combination produce a third solid angle γ. Likewise, it should be pointed out at this juncture that determining the solid angle in three-dimensional space only requires just two angles relative to two of the three axes to be indicated, since the precise angular dependency of the uplink user data signal resulting from the origin of the coordinate system and therefore the first antenna is explicit on the basis of the arrangement of the x, y and z axes on the basis of simple mathematical laws.

Figure 3:
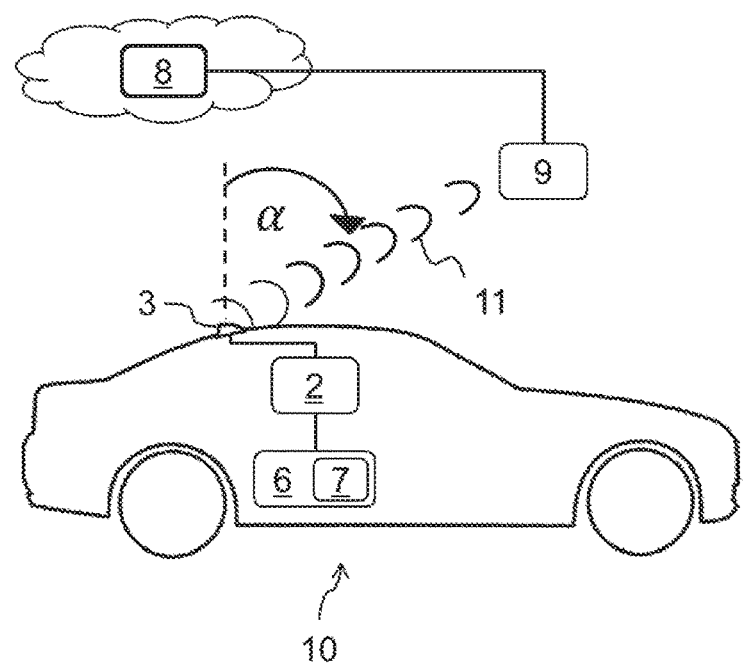
FIG. 3 shows an exemplary embodiment of a vehicle according to the invention.

FIG. 3 shows an exemplary embodiment of a vehicle 10 according to the invention. In this arrangement, the vehicle 10 has the communication interface 2, which is connected to a first antenna 3 arranged on the roof of the vehicle 10. Further, the communication interface 2 is connected to a control device 6 having a data memory 7. The communication interface 2 uses the at least one first antenna 3 to send radio signals 11 to the base station 9, which is connected to the backend 8. The radio signals 11 are furthermore preferably emitted over a first solid angle α. This first solid angle α has at least one angle for a two-dimensional contemplation, the solid angle preferably having two angles for three-dimensional space. According to the invention, a first uplink user data signal 12 is sent at a first solid angle α and a second uplink user data signal 13 is sent at a second solid angle β, which is different than the first solid angle α, to the base station 9, which forwards the received uplink user data signals, in particular in readable data form, to the backend 8, the depiction of the second uplink user data signal 13 having been dispensed with in this drawing for the sake of clarity. Preferably, these solid angles α, β are arranged oppositely at least in a two-dimensional space, preferably in a three-dimensional space.

The backend 8 is connected to the base station 9, by means of which the radio signals 11 emitted by the communication interface 2, which are in particular uplink user data signals, are receivable and which forwards the received radio signals to the backend 8. The uplink user data signals are converted into a digital data form in the base station 9, so that they are readable and processable by the backend 8.

The same wireless communication link between the communication interface 2 and the backend 8 can likewise be used to return a response from the backend 8 to the at least first antenna 3, and to receive said response thereon, via the base station 9 in the downlink direction.

Figure 4:
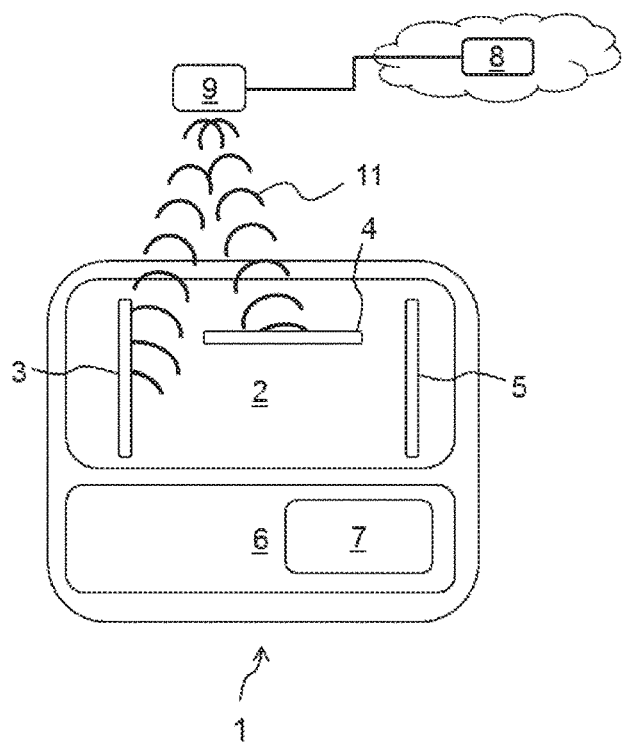
FIG. 4 shows an exemplary embodiment of an apparatus according to the invention for operation in a radio network having a wireless communication interface.

FIG. 4 shows an exemplary embodiment of an apparatus 1 according to the invention for operation in a radio network having a wireless communication interface 2.

The communication interface 2 has the first antenna 3, the second antenna 4 and the third antenna 5. The apparatus 1 additionally has the control device 6, which in turn has the data memory 7. Preferably, the control device 6 is configured to control the communication interface 2, in particular the at least one first antenna 3 thereof, preferably the second antenna 4 and third antenna 5 thereof.

The apparatus 1 is further set up to send an uplink user data signal via the first and/or second and/or third antenna 3, 4, 5 of the communication interface 2, in particular at the same time. For this purpose, the uplink user data signal is converted into an analog signal via the communication interface 2, so that this analog signal is sent to the base station 9 as a radio signal 11 and can be received by said base station in order to convert this analog signal into a digital signal and to forward it in a readable data form to the backend 8. It should be pointed out that the communication interface 2 can also have more than three antennas 3, 4, 5, preferably four, more preferably eight, and most preferably a number of antennas that is a power of two. The apparatus 1 is further preferably arranged in a vehicle 10, in particular a motor vehicle.

LIST OF REFERENCE SIGNS

1 Apparatus
2 Communication interface
3 First antenna
4 Second antenna
5 Third antenna
6 Control device
7 Data memory
8 Backend
9 Base station
10 Vehicle
11 Radio signal
12 First uplink user data signal
13 Second uplink user data signal
α First solid angle
β Second solid angle
γ Third solid angle
δ First angle
ε Second angle
100 Method The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a wireless communication interface for a radio network wherein the wireless communication interface is arranged in a motor vehicle and wherein the method is carried out while the motor vehicle is at a standstill, wherein the method comprises the acts of:
    emitting a first electromagnetic uplink user data signal by the wireless communication interface; and
    receiving at least one electromagnetic downlink user data signal by the communication interface,
    wherein the at least one electromagnetic downlink user data signal is emitted by a backend via the radio network, and
    wherein the at least one electromagnetic download user data signal denotes a channel quality indicator, determined by the backend, for the first electromagnetic uplink user data signal.

2. The method as claimed in claim 1, further comprising the acts of:
    emitting a second electromagnetic uplink user data signal by the wireless communication interface, wherein the wireless communication interface emits the first electromagnetic uplink user data signal at a first predetermined solid angle and the second electromagnetic uplink user data signal at a second predetermined solid angle, which is different than the first predetermined solid angle; and
    operating the wireless communication interface over the first or the second predetermined solid angle at which the first or the second electromagnetic uplink user data signal has the better channel quality indicator.

3. The method as claimed in claim 2, wherein the first and second predetermined solid angles are arranged oppositely at least in a two-dimensional plane.

4. The method as claimed in claim 1, further comprising the acts of:
    emitting a second electromagnetic uplink user data signal by the wireless communication interface, wherein the wireless communication interface emits the first electromagnetic uplink user data signal at least by a first antenna of the wireless communication interface and the second electromagnetic uplink user data signal at least by a second antenna of the wireless communication interface; and
    operating the wireless communication interface using the at least first or the at least second antenna for which the first or the second electromagnetic uplink user data signal has the better channel quality indicator.

5. The method s claimed in claim 4, further comprising the acts of:
    emitting the second electromagnetic uplink user data signal by the wireless communication interface, wherein the wireless communication interface emits the first electromagnetic uplink user data signal by at least the first and the second antenna and the second electromagnetic uplink user data signal by at least the first and/or the second antenna and at least one third antenna of the wireless communication interface at the same time; and
    operating the wireless communication interface using the at least first, second and/or third antennas for which the first or the second electromagnetic uplink user data signal has the better channel quality indicator.

6. The method as claimed in claim 2, wherein the channel quality indicator is dependent on a latency and/or a packet error rate of the first and/or the second electromagnetic uplink user data signal received from the backend.

7. The method as claimed in claim 3, wherein the channel quality indicator is dependent on a latency and/or a packet error rate of the first and/or the second electromagnetic uplink user data signal received from the backend.

8. The method as claimed in claim 4, wherein the channel quality indicator is dependent on a latency and/or a packet error rate of the first and/or the second electromagnetic uplink user data signal received from the backend.

9. The method as claimed in claim 2, further comprising the act of:
    storing the channel quality indicator, determined by the backend, of the at least first and/or the at least second electromagnetic uplink user data signal in a data memory of a control device.

10. The method as claimed in claim 3, further comprising the act of:
    storing the channel quality indicator, determined by the backend, of the at least first and/or the at least second electromagnetic uplink user data signal in a data memory of a control device.

11. The method as claimed in claim 4, further comprising the act of:
    storing the channel quality indicator, determined by the backend, of the at least first and/or the at least second emitted electromagnetic user data signal in a data memory of a control device.

12. The method as claimed in claim 6, further comprising the act of:
    storing the channel quality indicator, determined by the backend, of the at least first and/or the at least second electromagnetic uplink user data signal in a data memory of a control device.

13. The method as claimed in claim 9, further comprising the act of:
    storing, if the wireless communication interface does not receive a downlink user data signal denoting the channel quality indicator for the first and/or the second electromagnetic uplink user data signal, the channel quality indicator of the first and/or the second electromagnetic uplink user data signal with a predetermined value in the data memory of the control device after a predetermined interval of time after emission of the first and/or second electromagnetic uplink user data signal.

14. The method as claimed in claim 10, further comprising the act of:
    storing, if the wireless communication interface does not receive a downlink user data signal denoting the channel quality indicator for the first and/or the second electromagnetic uplink user data signal, the channel quality indicator of the first and/or the second electromagnetic uplink user data signal with a predetermined value in the data memory of the control device after a predetermined interval of time after emission of the first and/or second electromagnetic uplink user data signal.

15. The method as claimed in claim 2, further comprising the act of:
    receiving at least one further electromagnetic downlink user data signal by the wireless communication interface, wherein the at least one further electromagnetic downlink user data signal is emitted by the backend via the radio network, and wherein the at least one further user data signal denotes at least one channel quality indicator, determined by the backend, for the second emitted uplink user data signal.

16. The method as claimed in claim 3, further comprising the act of:
   receiving at least one further electromagnetic downlink user data signal by the wireless communication interface, wherein the at least one further electromagnetic downlink user data signal is emitted by the backend via the radio network, and wherein the at least one further user data signal denotes at least one channel quality indicator, determined by the backend, for the second emitted uplink user data signal.

17. The method as claimed in claim 4, further comprising the act of:
   receiving at least one further electromagnetic downlink user data signal by the wireless communication interface, wherein the at least one further electromagnetic downlink user data signal is emitted by the backend via the radio network, and wherein the at least one further user data signal denotes at least one channel quality indicator, determined by the backend, for the second emitted uplink user data signal.

18. The method as claimed in claim 1, wherein the acts of claim 1 are repeated if a predetermined parameter changes during operation of the wireless communication interface, wherein the predetermined parameter relates to a change of position of the wireless communication interface and/or expiry of a predetermined interval of time and/or exceedance of a packet error rate and/or exceedance of a latency of the first and/or second electromagnetic uplink user data signal and/or of at least one further received downlink user data signal.

19. An apparatus for operation in a radio network having a wireless communication interface, wherein the apparatus is arranged in a motor vehicle and, while the motor vehicle is at a standstill, is set up to emit a first electromagnetic uplink user data signal by the wireless communication interface and to receive at least one electromagnetic downlink user data signal by the wireless communication interface, wherein the at least one electromagnetic downlink user data signal has been emitted by a backend via the radio network, and the at least one electromagnetic downlink user data signal denotes a channel quality indicator, determined by the backend, for the first electromagnetic uplink user data signal.

20. A motor vehicle having the apparatus as claimed in claim 19.

\* \* \* \* \*